United States Patent
Xhunga

(10) Patent No.: US 8,052,311 B2
(45) Date of Patent: Nov. 8, 2011

(54) PULL-DOWN SELF-SUPPORTIVE LIGHTING MOUNTED ON HAND-REACHABLE CEILINGS

(76) Inventor: Ilo Kristo Xhunga, Avon, OH (US)

( * ) Notice: Subject to any disclaimer, the term of this patent is extended or adjusted under 35 U.S.C. 154(b) by 223 days.

(21) Appl. No.: 12/602,102

(22) PCT Filed: Nov. 25, 2009

(86) PCT No.: PCT/US2009/065931
§ 371 (c)(1),
(2), (4) Date: Nov. 26, 2009

(87) PCT Pub. No.: WO2010/062962
PCT Pub. Date: Jun. 3, 2010

(65) Prior Publication Data
US 2010/0296301 A1   Nov. 25, 2010

Related U.S. Application Data

(60) Provisional application No. 61/118,039, filed on Nov. 26, 2008.

(51) Int. Cl.
*F21V 21/00* (2006.01)

(52) U.S. Cl. ........ 362/387; 362/198; 362/403; 362/471; 362/490

(58) Field of Classification Search .................. 248/160; 362/198, 403, 404, 407, 387, 418, 459, 471, 362/490
See application file for complete search history.

(56) References Cited

U.S. PATENT DOCUMENTS

| | | | |
|---|---|---|---|
| 2,667,323 A * | 1/1954 | Mason | ........................... 362/418 |
| 5,077,643 A | 12/1991 | Leach | |
| 5,209,562 A | 5/1993 | Glassford | |
| 5,521,806 A | 5/1996 | Hutzel | |
| 6,257,745 B1 | 7/2001 | Speth | |
| 6,680,844 B2 | 1/2004 | Kim | |
| 6,808,289 B2 | 10/2004 | Reed | |
| 6,896,395 B2 | 5/2005 | McKenzie | |
| 7,000,746 B2 | 2/2006 | Mackin | |
| 7,101,058 B2 | 9/2006 | Prell | |
| 7,104,675 B2 | 9/2006 | Chen | |
| 7,150,548 B2 | 12/2006 | Kohlmeler-Beckmann | |
| 7,198,513 B2 | 4/2007 | Marchese | |
| 7,244,039 B1 | 7/2007 | Emmons | |
| 7,244,058 B2 | 7/2007 | DiPenti | |
| 7,261,450 B2 | 8/2007 | Tiesler | |
| 7,287,886 B2 | 10/2007 | Iwai | |
| 7,287,890 B2 | 10/2007 | Okabe | |
| 7,390,105 B2 | 6/2008 | Nelson | |
| 7,404,655 B2 | 7/2008 | Walser | |
| 7,494,254 B2 * | 2/2009 | Rogers | ........................... 362/407 |
| 7,534,017 B2 | 5/2009 | Barowski | |
| 2004/0032741 A1 | 2/2004 | Tai | |
| 2005/0024886 A1 | 2/2005 | McKenzie et al. | |
| 2007/0008719 A1 | 1/2007 | Hill | |

* cited by examiner

Primary Examiner — Stephen F Husar

(57) ABSTRACT

Pull-down self-supportive lighting device mounted on hand-reachable ceilings, the lighting device comprising retracting unit (25), illuminating unit (23), and gooseneck (41) connected between units (25) and (23). Retracting unit (25) is mounted above an opening on the ceiling. Illuminating unit (23) has a retracted position adjacent to retracting unit (25). Gooseneck (41) has a predetermined internal structure and a bendability and rigidity balance that allows its winding inside retracting unit (25) while being able to hold illuminating unit (23) fixed in place. As a user pulls down finger-handle (31), gooseneck (41) unwinds allowing illuminating unit (23) to take a multitude of pull-down lighting position targeting the viewing area. With a press of pushbutton (29), retracting unit (25) pulls up illuminating unit (23) towards the retracted position wherein the user snaps it in with one hand.

18 Claims, 12 Drawing Sheets

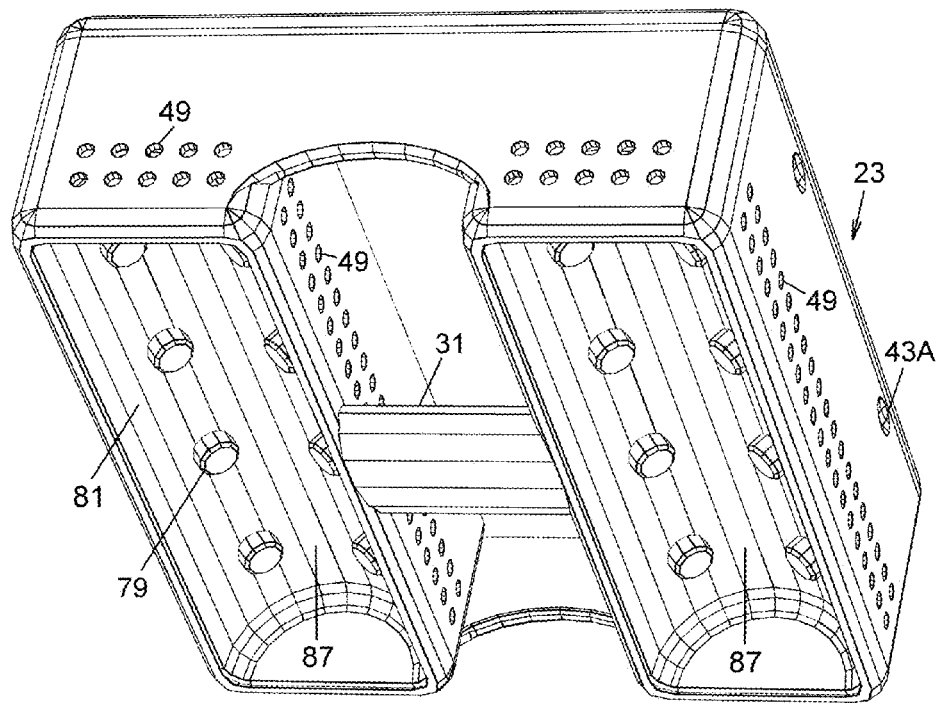
FIG. 10
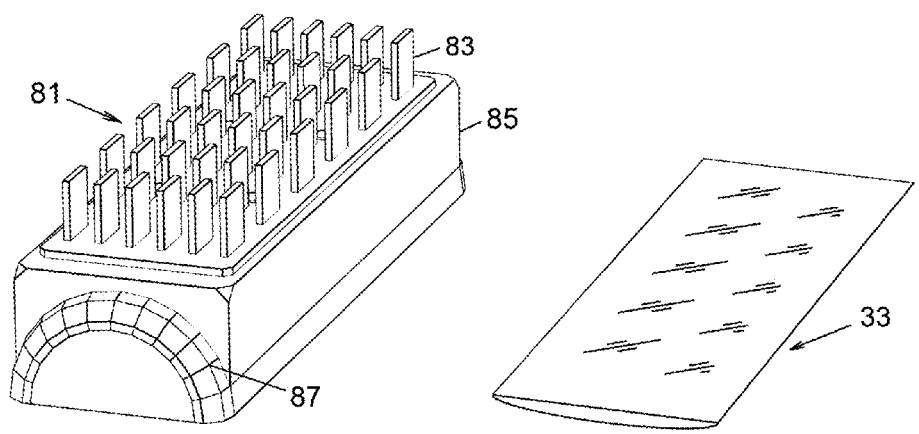
FIG. 11
FIG. 12

PULL-DOWN SELF-SUPPORTIVE LIGHTING MOUNTED ON HAND-REACHABLE CEILINGS

TECHNICAL FIELD

This invention relates to lighting of vehicle interiors, and more specifically it relates to lighting mounted on reachable-by-hand vehicle ceilings or other low ceilings.

BACKGROUND ART

At present, primarily a ceiling-mounted overhead console provides general ambient lighting for vehicle interiors. The console lighting is associated with some drawbacks. It does not provide adequate peripheral lighting. Sometimes vehicle occupants find themselves in need of more lighting and bring a written note or the interior of a bag under the overhead console to see it. It casts shadows in places that need lighting. For example, the lap of a front-row-seat occupant can be shadowed by the head and shoulders of the occupant being in the light's way. Furthermore, the leg area of the back row can be shadowed by front-row seats. Although lighting is pleasing to an occupant who needs it, it might be annoying for other occupants who do not need it at the moment. The light reflected from windows or other shiny parts may impede the outside view of the driver, or the console light may expose the inside of a vehicle to outsiders in an unsafe neighborhood.

As the console lighting does not satisfy all the needs of vehicle occupants, other extra lights are added in different locations—vanity mirror lights on sun visors, courtesy lights on door panels, reading or map lights, extra lights for footwell areas, etc. The vanity-mirror lights are located in front of the eyes, contrary to the teachings of eye-vision optics. Exposed courtesy lights can also be disturbing to the eye. Lighting fixtures under the hood of engine compartment and those in luggage compartment of vehicles have poor peripheral lighting and create human-body shadows of the user when serving the engine or searching in the trunk. The ceiling passenger-seat lighting in airplanes allows only directional adjustment that is limited. As a passenger might bend forward to look at an object more closely, the head and shoulders may shadow the area. Furthermore, the peripheral lighting of the overhead console might annoy nearby passengers that may be resting.

In spite of many extra lights added in several locations, occupants of automobiles, trucks, buses, trains, watercraft, and airplanes are still expected to avoid light shadows or the direct stray light to the eye by adjusting their bodies to lighting that is fixed in place.

Several patents or publications have addressed at least partially some of the aforementioned problems of lighting in vehicle passenger compartments:

U.S. Pat. No. 6,896,395 of McKenzie and Kempf discloses a retractable lighting system that uses a crank dial, a system of pulleys, and cables with light generators. The user has to use the crank dial to extend down any of a system of cables. Again, the user has to crank the dial mechanism back so that the illuminating units are returned to the retracted positions.

Publication US 2007/0008719 of Hill discloses a hand-held flash light connected by a retractable tether to a spool housing. The retractable flash light can be extended to illuminate the footwell under the driver or passenger seat (see paragraph [0164] of the publication).

U.S. Pat. No. 6,257,745 of Speth and Sak discloses a lighting system with a flexible hose that has to be disposed [tackled] by the user into a channel of a semi-circular cross section positioned about the periphery of a dome light in the vehicle's ceiling. Before deploying the flexible hose light, the user has to insert [pry] the finger into the channel and detach the lamp housing and the flexible hose from the retention mechanism (see end of page 3 and beginning of page 4 of the patent).

U.S. Pat. No. 7,261,450 of Tiesler discloses a dual function interior console lamp having a first position to provide dome or general-purpose ambient lighting and a second position to provide a positionable reading lamp.

U.S. Pat. No. 7,081,007 of Marchese discloses an electrical fixture in fixed relationship with a ceiling and an electrical outlet attached to an electrical cable so that the outlet can be moved between a retracted position adjacent to the light fixture and an extended position, as the electrical cable is dispensed from the retraction mechanism.

Publication WO 03/101779 of Smith and others shows an auxiliary light mounted on the upper edge of the driver's door, which can be retracted when not in use and extended to illuminate outwardly from the vehicle or inwardly.

With all the efforts addressing the aforementioned problems, the prior art is still missing a self-supportive lighting device that can be pulled down by the user with a natural move of one hand and which can be pulled back to the ceiling just as easily with the press of a button.

DISCLOSURE OF INVENTION

By way of example, two embodiments disclose a pull-down self-supportive lighting device mounted in reachable-by-hand ceilings of vehicle interiors, closets, or other low-ceiling interiors. The device comprises an illuminating unit, a gooseneck, and a retracting unit. The gooseneck physically connects the retracting unit and the illuminating unit. The gooseneck also encloses conductive wires to feed electricity to the illuminating unit which is functional in the retracted position and in the pulled-down position. In addition, it is user-adjustable and self-supportive when pulled down. The gooseneck has a predetermined ratio of bendability and stiffness that allows both repositioning and holding fixed of the illuminating unit in a position of best lighting for the user. The lighting device is self-supportive even when displaced by the user laterally in a horizontal direction from its hanging point.

The gooseneck is concealed above the ceiling when the illuminating unit is in its retracted position. The bottom part of the illuminating unit stands flush with the vehicle's headliner or the bottom surface of a ceiling. As a user pulls a finger-handle (which in one aspect of the invention is located at the bottom center of the illuminating unit) preferably with two fingers and the thumb of one hand, the bendable gooseneck unwinds as its illuminating unit pulls down. When the user presses a return pushbutton, the retracting unit retracts and rewinds the gooseneck back, pulling up the illuminating unit in its retracted position on the ceiling.

By way of example, one embodiment of the invention has its retracting unit mounted vertically upward behind a faceplate on the ceiling. Upward mounting of the retracting unit makes vertical pulling of the gooseneck easy. This type of mounting fits well in ceilings of large vehicles like buses, railroad cars, watercraft, and airplanes, which have high-rising space available between the passenger-compartment ceiling and the vehicle-inclosing shell.

Another embodiment has its retracting unit mounted flat or horizontally over the faceplate. The movement of the gooseneck into and out of the retracting unit is guided by rollers. The flat mounting fits in ceilings of small vehicles like cars, trucks, minivans, and crossovers, which have only low-rising space available above the ceiling between the headliner and the vehicle-enclosing shell. The device can also be mounted under the hood of the engine compartment of vehicles, as well as under the cover of the luggage compartment (trunk) of vehicles.

In addition to being installed in vehicle interiors, the pull-down lighting device can be installed in other places like houses or other buildings where ceilings are within hand's reach, some closets being an example. The light emitted from conventional fixtures in many closets can be blocked by head and shoulders casting shadows in viewing areas. The pull-down lighting device eliminates shadows, as well as the stray light to the eye. The device can also be installed in hand-reachable ceilings, such as over bunk beds in watercraft cabins or children's summer camps, to mention a few examples.

The pull-down self-supportive device offers enhanced functionality and improves the quality of lighting with its location and direction control. It is as if somebody is holding a light in the position and direction of the user's choice.

Other features and advantages of the present invention will be readily apparent from the following detailed description of the preferred embodiments when taken in connection with the accompanying drawings.

BRIEF DESCRIPTION OF DRAWINGS

The accompanying drawings in conjunction with the detailed description illustrate embodiments of the invention and explain its principles. Figures show whole devices, main units, and their parts. Displays of embodiments first start with whole-device drawings and continue with more detailed drawings of the main units and their internal parts, as devices are opened and their insides revealed.

FIG. 10 is a bottom view of the illuminating unit with diffusing lenses removed.

FIG. 11 shows a lighting source from above.

FIG. 12 shows a diffusing lens.

THE BEST MODES FOR CARRYING OUT THE INVENTION

First Embodiment

FIGS. 1 to 15

The first embodiment or the rising embodiment fits on the ceilings of vehicles like buses, railroad cars, trucks, watercraft, airplanes, and the like that usually have high-rising space available between the passenger-compartment ceiling and vehicle-enclosing shell. The contemplated installation has preferably one lighting unit per occupant in the ceiling above the seat. The first embodiment is the simplest (having less components) of the two embodiments disclosed in detail in the description and drawings.

Figure 1:
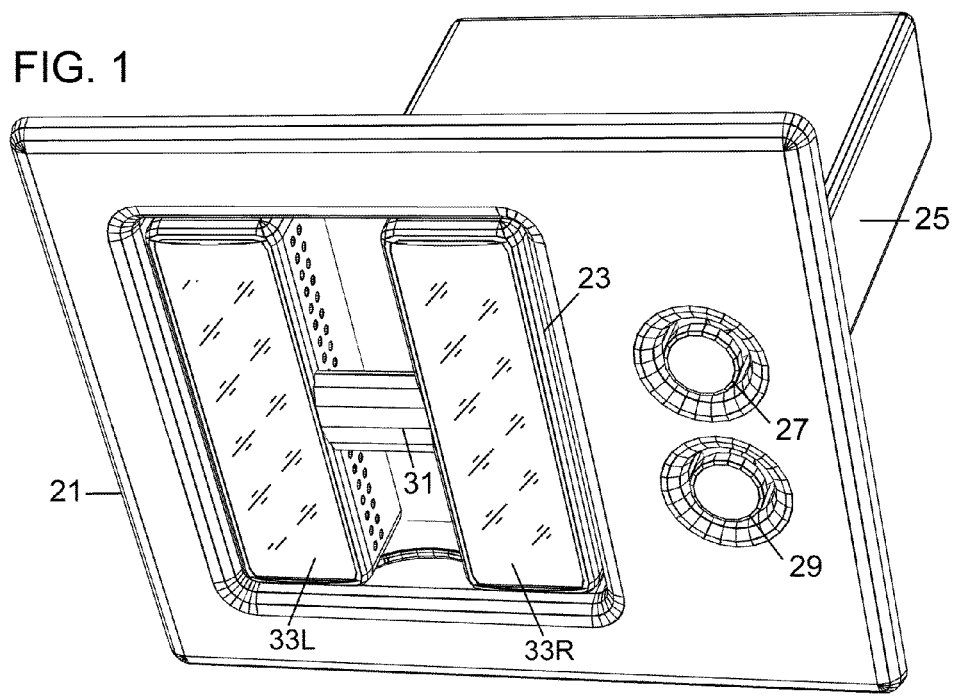
FIG. 1 is the bottom and FIG. 1A is the top perspective view of the first embodiment of a pull-down lighting device for vehicles.
Figure 1A:
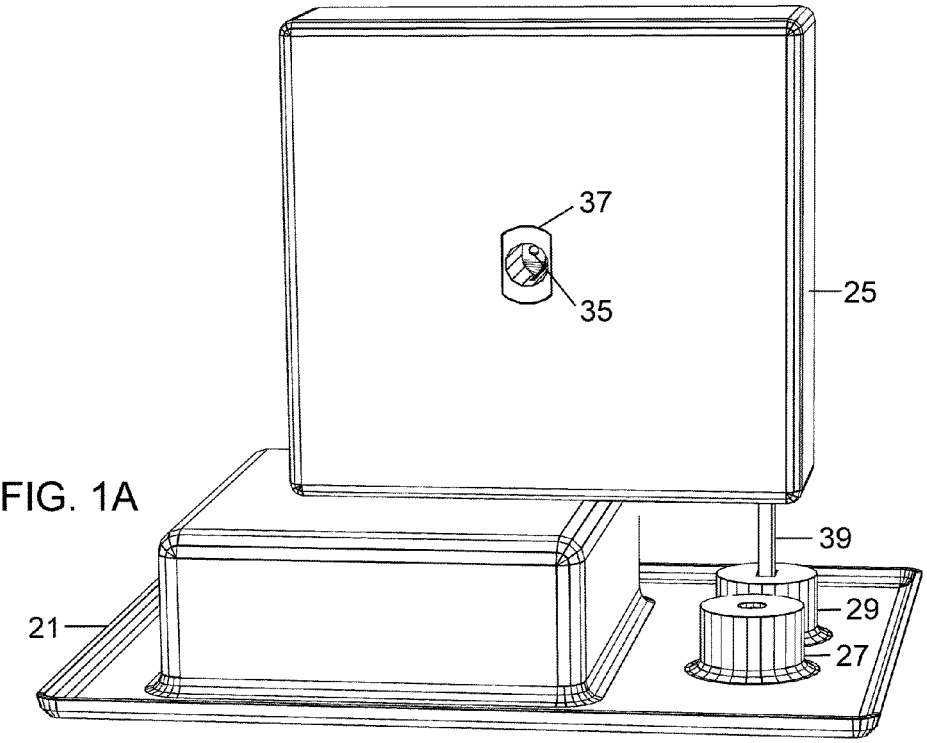

FIG. 1 is the bottom and FIG. 1A is the top perspective view of the first embodiment of the pull-down self-supportive lighting device. In the rising embodiment, retracting unit 25 is mounted vertically above illuminating unit 23 on faceplate 21. Illuminating unit 23 is shown in its retracted position inside the indentation of faceplate 21. Illuminating unit 23 provides general or ambient lighting as a usual interior light in this retracted position. Faceplate 21 is secured on the vehicle's headliner (not shown) and preferably on the vehicle's roof structure. It can be mounted preferably flush with the headliner. Bottom-center positioning of finger-handle 31 makes it easy to pull down illuminating unit 23. Lenses 33L on the left and 33R on the right diffuse light emitted from a plurality of light emitting diodes (LED-s) 79 mounted inside illuminating unit 23 (shown in FIG. 10).

Figure 2:
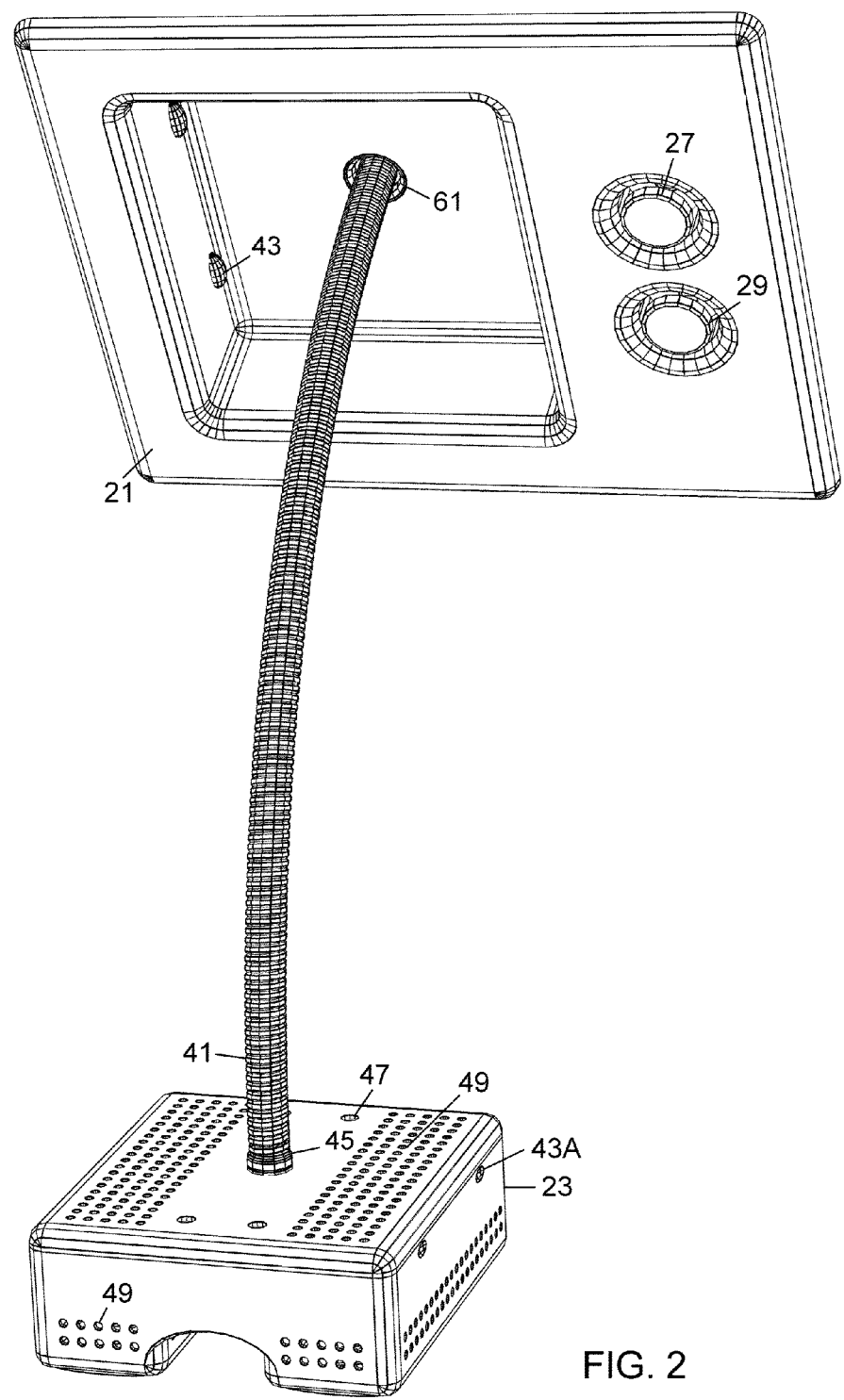
FIG. 2 shows the pull-down lighting device with its illuminating unit pulled down.
Figure 3:
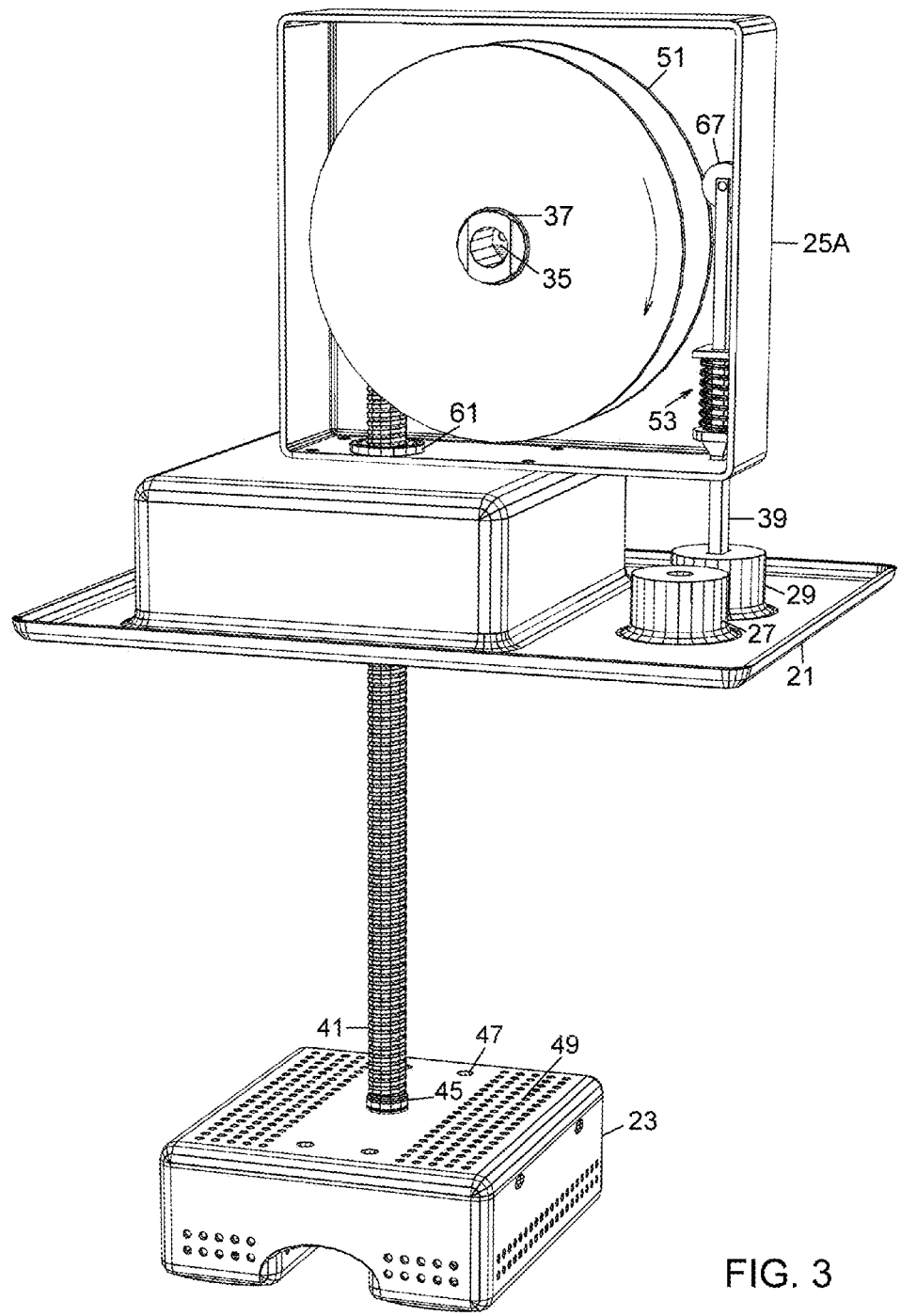
FIG. 3 is a top view of the pull-down lighting device with its retracting-unit lid removed.

Pushbutton 27 is an electric (on/off) power switch. At the bottom end of actuator rod 39 is mounted pushbutton 29, a mechanical switch that releases lock-and-release mechanism 53 of retracting unit 25. FIG. 2 is a bottom perspective view of the lighting device with illuminating unit 23 in a pulled-down position. Reel 51 and lock-and-release mechanism 53 are viewable in FIG. 3, after upper parts of retracting unit 25 are removed.

Gooseneck 41, which connects illuminating unit 23 with retracting unit 25, is pulled out of reel 51 through smooth nipple 61. The upper part of illuminating unit 23 is connected with gooseneck 41 with smooth upper nut 45. Gooseneck 41 is bendable enough to bend in reel 51, and rigid enough to hold illuminating unit 23 fixed in a pulled-down position. The gooseneck is defined as an elongated bendable arm with a predetermined combination of bendability and rigidity for holding or supporting, and adjustably repositioning an object attached at one end, with a longitudinal through-hole or channel inside for enclosing, insulating, and protecting electric wires (either removable or permanently imbedded). The terms 'gooseneck' and 'bendable conduit' are used interchangeably.

Bumps 43 snap-on into indents 43A and hold illuminating unit 23 steadily in its retracted position on faceplate 21. At present, it is contemplated that bumps 43 of this embodiment be made of a soft synthetic resin (silicon rubber) or the like, so that the vibrations occurring when the vehicle is moving can be absorbed adequately, but other materials can also be suitable. Indeed, in its retracted position, illuminating unit 23 can be coupled to faceplate 21 in a variety of other snap-on designs, well known to those of ordinary skill in the art. Notice also that from the concealed position inside retracting unit 25, bendable conduit 41 maintains a permanent biasing force on illuminating unit 23, further reinforcing the unit's stability in the retracted position.

Retracting Unit

Figure 5:
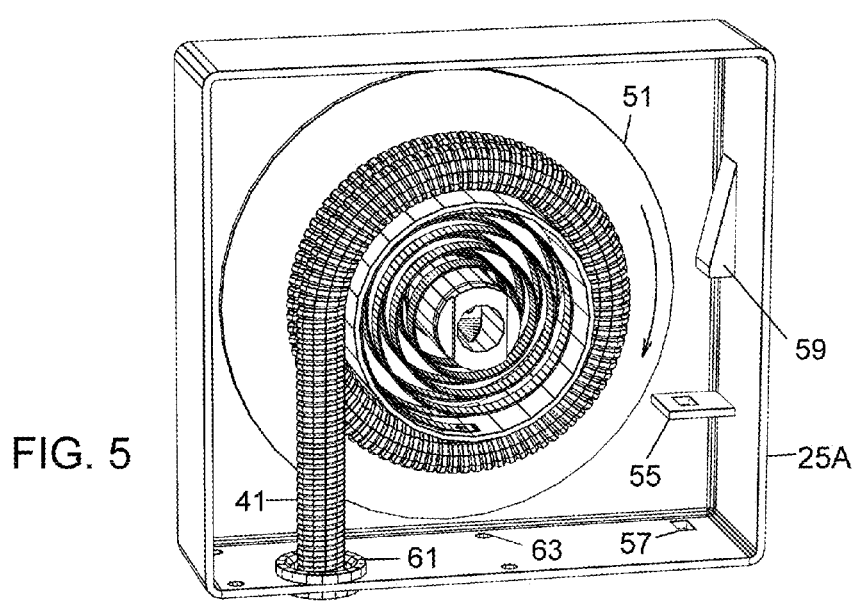
FIG. 5 is an open view revealing the gooseneck winding and the supports of the lock-and-release mechanism.
Figure 6:
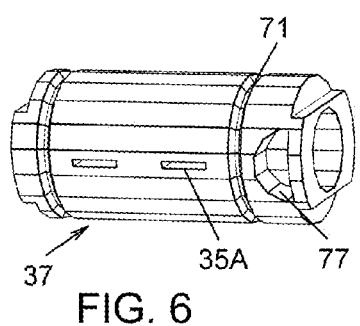
FIGS. 6, 7, and 8 reveal details of arbor, reel, and conducting springs, respectively.
Figure 7:
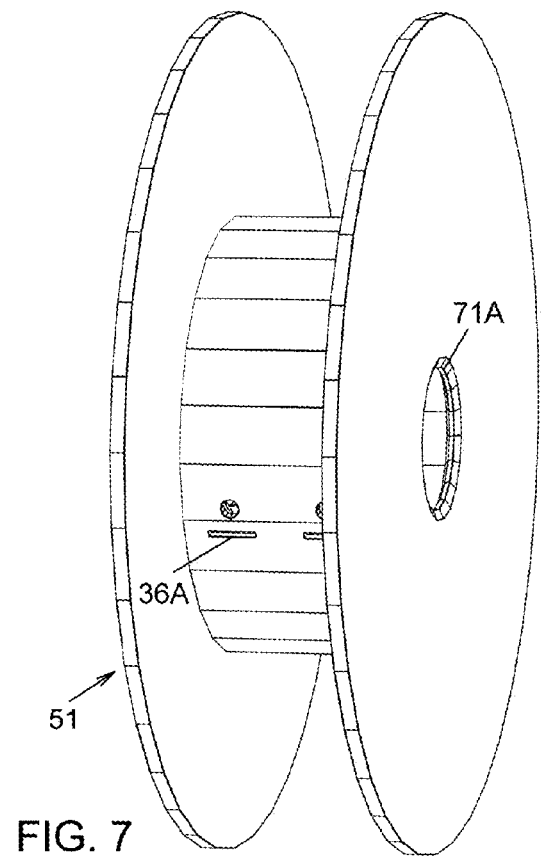
Figure 9:
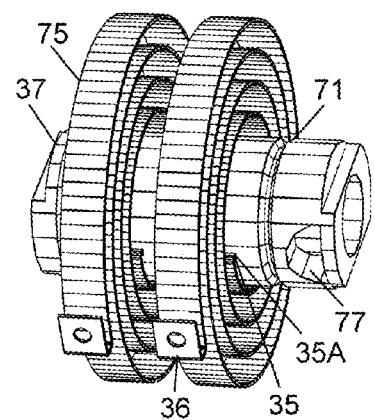
FIG. 9 shows springs mounted on the arbor.

Retracting unit 25 houses reel 51 and lock-and-release mechanism 53 (FIG. 3) which is externally activated by pushbutton 29. Retracting unit 25 is mechanically joined with faceplate 21 with screws (not shown) through holes 63 (FIG. 5). As gooseneck 41 is pulled down, lock-and-release mechanism 53 prevents reel 51 from rolling back, and illuminating unit 23 can stay indefinitely fixed in a pulled-down position until further action is taken. Rod-guiding support 55, rod-guiding opening 57, and friction pad 59 are the static parts of lock-and-release mechanism 53. These parts are made visible after other parts of lock-and-release mechanism 53 are removed in FIG. 5. Winding of gooseneck 41 is also made visible after the front plate of reel 51 is removed. Reel 51 is urged by two spiral springs 75 that produce a pulling torque. Their rotational tendency is always to retract illuminating unit 23 into its retracted position. Spiral springs 75 are also known as power springs, or clock springs, and are mounted on arbor 37 at one end and on the base of reel 51 at the other (FIGS. 5 and 9). Spiral springs 75 are similar to springs used in applications such as cable-retracting reels, tape measures, and retracting seat belts.

Figure 4:
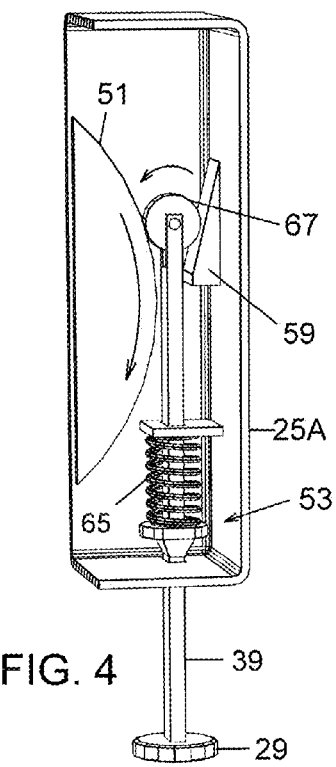
FIGS. 4 and 4A are cut-away views focused on lock-and-release mechanism functions.
Figure 4A:
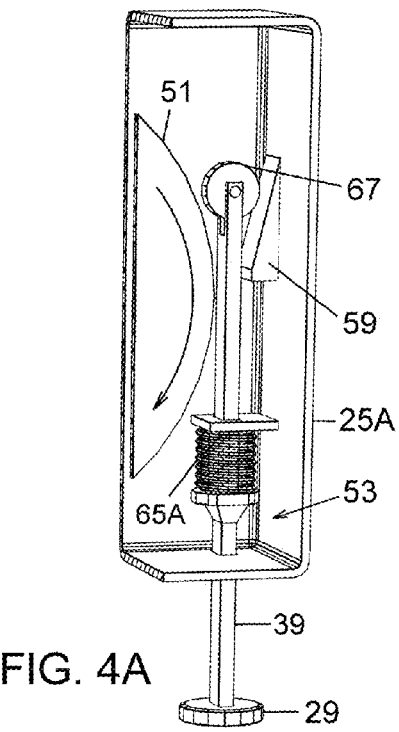

FIGS. 4 and 4A are cut-away views of retracting unit 25; they show the structure and operation of lock-and-release mechanism 53 in two different states. In FIG. 4, compression coil spring 65 is relaxed, and in FIG. 4A, compressed coil spring 65A is loaded, as the user presses pushbutton 29.

Curved arrows in FIG. 4 show directions of rotational tendencies of reel 51 and stopper wheel 67. The larger curved arrow in FIG. 4A shows the rotation of reel 51 after return pushbutton 29 is pressed.

Figure 8:
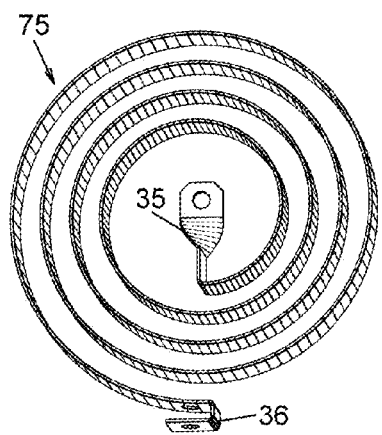

In the first or normal state, reel 51 (FIGS. 4 and 5) has a permanent tendency to rotate in the arrow direction driven by loaded springs 75 (FIGS. 8 and 9). Stopper wheel 67 squeezes between the rim of reel 51 and friction pad 59. Rewinding back of reel 51 is locked by frictional forces created on the pressed contact surfaces.

In the second state, return pushbutton 29 is pressed, stopper wheel 67 moves upward and releases reel 51, which rewinds and pulls back illuminating unit 23 towards its retracted position. When pushbutton 29 is not pressed, spring 65A expands again taking the form of compression coil spring 65, and stopper wheel 67 drops down to lock reel rotation. In short, lock-and-release mechanism 53 blocks and releases rotation of reel 51, while power springs 75 inside the reel continuously keep urging its rotation.

On the other hand, lock-and-release mechanism 53 allows rotation of reel 51 in reverse direction when a user pulls down illuminating unit 23 from finger-handle 31. A user can pull illuminating unit 23 down from the retracted position to any intermediary position. Or the user can pull from an intermediary position further down to another intermediary position. A user's pulling force must overcome the rewinding torque of spiral springs 75 inside reel 51, but the downward force is easy and convenient to apply.

As the user pulls down finger-handle 31, reel 51 and stopper wheel 67 rotate in the opposite direction of that shown by the arrows in FIGS. 4 and 5. As stopper wheel 67 starts rotating and moving upward, reel 51 rotates unobstructed. Gooseneck 41 unwinds and illuminating unit 23 pulls down. Edges 71A slide on grooves 71 as reel 51 rotates around arbor 37.

Besides storing mechanical energy, spiral springs 75 serve as electric conductors. An alloy named 67KN5B is used to make current conducting springs. It reaches its best combination of fairly high elastic properties and good electric conductivity after quenching from 950 degrees Celsius and aging at 600 degrees Celsius. There are also other alloys for conducting springs known to those of ordinary skill in the art. Springs 75 provide two conducting paths that feed electricity to illuminating unit 23. There is no need for rotational sliding contacts. Conducting springs work as both springs and conductors, and simplify the nomenclature of parts.

Each spring has an inner electric contact 35 and an outer contact 36, shown in FIGS. 8 and 9. The inner contacts 35 of springs 75 enter slots 35A shown if FIG. 6, and are fastened to arbor 37. The outer contacts 36 enter reel slots 36A shown in FIG. 7, and are fastened to reel 51. FIGS. 5 and 9 show spiral springs 75 mounted on arbor 37 and inside reel 51.

Electric wires (not shown) enter opening 77 and are connected with contacts 35 inside arbor 37. Two other electric wires (not shown) are connected with contacts 36 running through the inside of gooseneck 41 to reach illuminating unit 23.

Illuminating Unit

Illuminating unit 23 (FIGS. 10 to 13) houses two light sources 81. Finger-handle 31 is located at the bottom-center of illuminating unit 23. The use of centrally-positioned finger-handle 31 facilitates the pull-down of unit 23. It allows the convenient application of a downward central force with a one or two-finger grip. Finger-handle 31 is also handy in guiding the return of illuminating unit 23 to its retracted position with one hand, while pressing the return pushbutton 29 with the other.

A plurality of ventilating holes 49 are cut through the inner sides, outer sides, and through the lid of illuminating unit 23 to allow the convectional flow of air. Free airflow takes away the heat from heat sinks 83 allowing illuminating unit 23 to remain cool on the surface.

A plurality of LED-s 79 is mounted at the bottom of light source 81, protruding through light reflectors 87. Housings 85 enclose driving circuits (not shown) that contain printed circuit boards and control electronics for driving LED-s.

Figure 15:
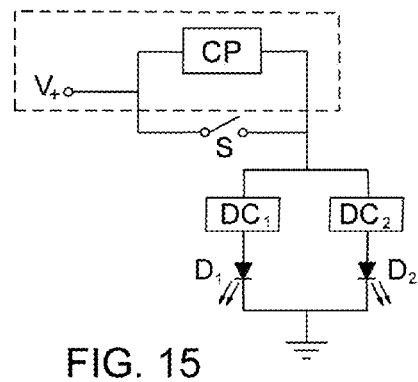
FIG. 15 shows the electric schematics of the pull-down lighting device.

FIG. 15 shows the electronic control and power connections of illuminating unit 23. The pull-down lighting device is connected to the vehicle's electric system $V_+$. Switch S in schematics is power pushbutton 27 in drawings, which turns on and off illuminating unit 23 in the retracted position and in any pulled-down positions. Vehicle's control processor CP is connected in parallel with Switch S. Processor CP gets signals from a variety of sensors (not shown) such as an opened-door sensor, and turns on illuminating unit 23 independently of switch S. Its control works the same whether illuminating unit is in the retracted position or in a pulled-down position.

There are two light sources 81 inside illuminating unit 23. One is represented in the schematics by the group of LED-s $D_1$ and driving circuit $DC_1$, and the other by $D_2$ and $DC_2$. Heat sinks 83 (FIG. 11) stand on top of light sources 81 (also shown inside illuminating unit 23S in FIG. 20). Heat sinks 83 pull out the relatively small amount of heat dissipated by LED-s and DC-s. Heat sinks have direct contact with driving circuits allowing for the transfer of heat while providing electric insulation. Illuminating units 23 and 23S are kept cool on the surface by free air convection through ventilating holes 49 on the top and bottom of the units.

Light diffusing lenses 33 enclose LED-s and diffuse the light outward. They are antiglare lenses that control the cones of light, preventing its overspread on windows or other shiny objects. The elongated shape of lenses 33, their material, and curvatures of their top and bottom surfaces, determine the sizes of light cones. Any of the three above factors can be modified to satisfy different vehicle circumstances or customer preferences.

Figure 13:
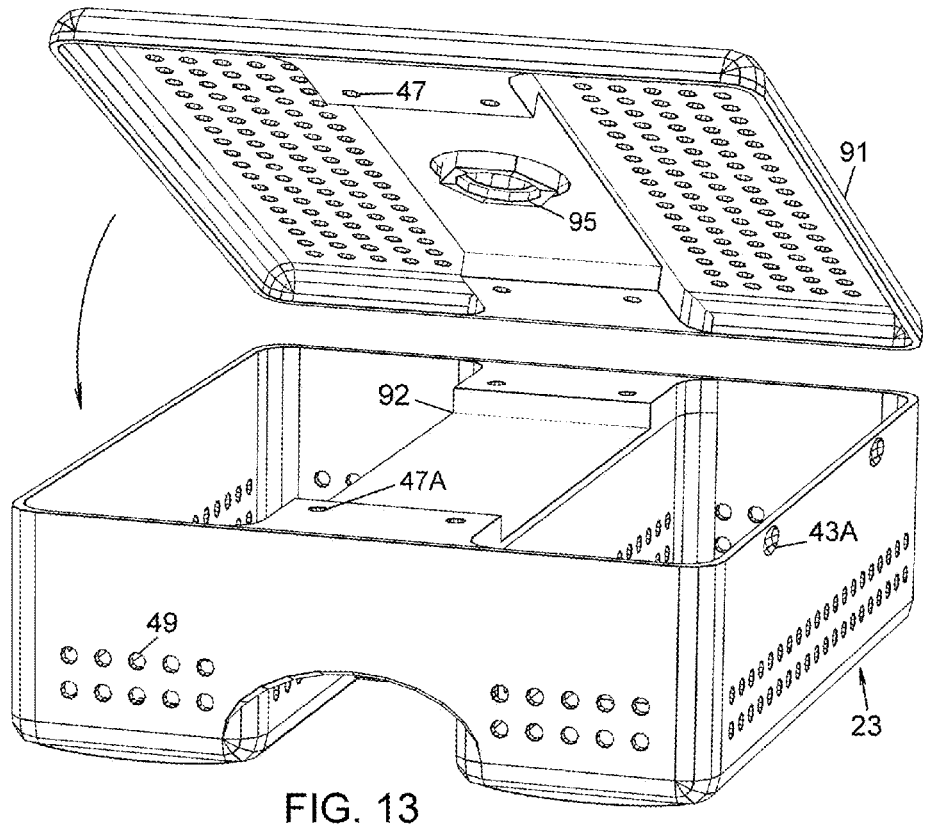
FIG. 13 is an exploded view of the illuminating unit with its internal light sources removed.

FIG. 13 is an open view of illuminating unit 23, shown empty to reveal its interior design. Lid 91 is fastened to the base of illuminating unit 23 with four screws. Screw holes 47 of core 92 match screw holes 47A of lid 91. Tightening nut 95 fastens the end of gooseneck 41 (not shown) with bottom of lid 91. Wires (not shown) from gooseneck 41 run through nut 95 and are connected to light sources 81 through holes (not shown) of heat sinks.

Illuminating unit 23 has LED light sources that draw their power from the vehicle's electric system. They do not need a battery pack as a power source. Consequently, the design of illuminating unit is simplified, number of parts reduced, and its weight minimized.

The illuminating unit is also shock-proof and very durable. Unlike lamps that use light bulbs that can be broken, this illuminating unit has no breakable parts.

Another advantage of LED-s is their very long life expectancy. Unlike light bulbs which need to be replaced fairly often, LED-s require little or no replacement.

Bendable Conduit—Gooseneck

Figure 14:
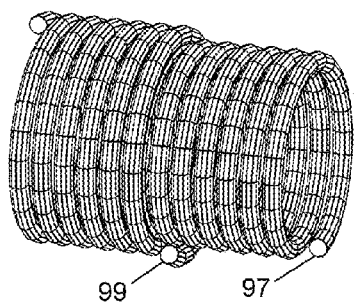
FIG. 14 shows fractions of the enlarged gooseneck coils.

Gooseneck 41 is a bendable elongated tubular enclosure with a predetermined rigidity. While being bendable by a user, the gooseneck is rigid enough to hold a certain weight connected at one end. Its internal structure has two coils of circularly and tightly wound wire. The larger coil is in touch with the outer surface of the smaller coil, enclosing the latter. Fractions of two enlarged gooseneck coils are shown in FIG. 14, where coil 99 embraces coil 97. Two insulated electric wires (not shown) run inside along the length of coils. Electric wires are either replaceable or embedded permanently at fabrication. The gooseneck is finished with a plastic or rubber coating. One wire coil provides bendability to the gooseneck. However, a bent coil left on its own returns to its initial form. A single coil of wire is elastic. It does not preserve its bended shape. Goosenecks should be designed to ideally have zero elasticity.

The gooseneck structure, in which two coaxial coils are mounted one inside the other as shown enlarged in FIG. 14, creates a gooseneck with "frozen" coil elasticity, allowing it to preserve its form. Internal forces of static friction at points of contact between the outer surface of the smaller coil and the inner surface of the larger coil prevent the coils from moving or sliding past each other. Once bent, the gooseneck keeps its shape. Forces of static friction "freeze" the gooseneck's obtained form until the gooseneck is enforced once again from an outside agent (the user or the retracting unit) to take a new shape and a new position. Static friction at the contact surface between the coils introduces rigidity to the gooseneck.

Due to static friction, the gooseneck can maintain its form even while holding the weight of an illuminating unit at its end. The combination of two coils gives the gooseneck its holding capacity. The more rigid a gooseneck is, the more weight it can hold. Its rigidity is determined by coil diameters, clearance gaps between coils, coil winding directions, type of material of coil wire, wire thickness, etc. Various degrees of rigidity are obtained by manipulating the above factors.

For an illuminating unit of known weight, a gooseneck with the proper ratio of bendability and rigidity is chosen. Gooseneck should be bendable enough to allow manual repositioning of illuminating unit, but stiff enough to allow it to assume a fixed position.

There is also another aspect to consider about illuminating unit 23. Users need freedom to reposition the illuminating unit not only by pulling it down, but also by moving it laterally in any horizontal direction. The gooseneck should be able to hold the illuminating unit fixed in positions that are laterally or horizontally displaced from the vertical line at the hanging point. A conduit with low rigidity can easily hold an illuminating unit in a position directly below the hanging point. However, the more lateral displacement is desired, the more rigid the gooseneck must be.

The volume (cylindrical in shape) of space available for positioning the illuminating unit becomes larger, once lateral displacement is permitted. The radius of that cylinder is the maximum horizontal displacement from the hanging point that the gooseneck can tolerate. A lateral displacement of 20 to 30 centimeters (8 inches to 1 foot) will give enough room to find a convenient lighting position for illuminating unit under usual circumstances. The height of that cylinder is only limited by gooseneck length. Gooseneck lengths in the range of 60 to 120 cm (2 to 4 ft) are suitable for interior spaces of most vehicles. Users will have sufficient room to position illuminating unit conveniently around their seating area.

In conclusion, the gooseneck is selected based on two operating parameters of the illuminating unit—weight and lateral displacement. For an illuminating unit of large weight and large limit of lateral displacement, a relatively stiff gooseneck is required. On the other hand, an illuminating unit of smaller weight and reduced lateral displacement is easily manipulated with an easily bendable gooseneck with less stiffness. This is advantageous, because the latter gooseneck would also be lighter in weight, smaller in thickness, and easily woundable in a reel. As a result, a smaller and lighter retracting unit is required.

The bending limit is defined as the smallest radius of curvature that the gooseneck can tolerate at bending. If forced to bend more than the limit, it either will not hold the given form or will be damaged. The smallest permitted diameter of the base of reel 51 is restricted by the gooseneck's bending limit, as shown in the following section. Sizes and positions of the guiding rollers, in the second embodiment of the device, are also chosen so that the gooseneck bends through them, but does not reach its bending limit. With increases in gooseneck use, it is reasonable to expect that gooseneck quality is going to further improve. For the same load weight and lateral displacement, gooseneck thickness and bending limit will become smaller than what they are today. Consequently, retracting units will also become smaller in size and weight.

Sizing of the Reel

Thickness, bending limit, and length are three parameters of gooseneck 41 that determine the size of reel 51 in retracting unit 25. The bending limit of a gooseneck is expressed by its minimum radius of curvature. Consider, for example, a gooseneck 90 cm (3 ft) long that has a minimum radius of bending curvature of 4 cm. Calculations, that are straightforward for one of ordinary skill in the art, show that the minimum diameter of a gooseneck winding in the reel must be 8 cm or larger. Consequently, the diameter of the base of reel 51 should be also 8 cm or larger. Nearly three windings in that reel will suffice to retract the whole gooseneck length of 90 cm. Let's assume that gooseneck thickness is about 1 cm and windings in the reel stay side by side in one layer. Then the outer diameter of the reel must be about 10 cm, and its thickness around 3.5 cm. A reel of this thickness works very well for the first embodiment of the pull-down lighting device that is designed for high-rise ceilings of large vehicles like buses, trucks, railroad cars, watercraft, and airplanes.

Conversely, a thin reel will coerce windings to wind one above the other. In this case, the reel's outer diameter must be increased to around 12 cm, but its thickness can be as low as 1.2 cm (½ inch), including its two side plates. Thin reels are suitable for the second embodiment of the device that is adapted to fit in low-rise ceilings of small vehicles like cars, trucks, minivans, and crossovers.

Springs—More Torque, Less Rotation

Spiral springs 75 have torque and rotation values in this device that are different from those of springs in other reels (for example springs of cable retracting units in vacuum cleaners). Torque and revolutions of springs 75 are determined based on gooseneck rigidity and length.

The rigidity of goosenecks employed in a pull-down lighting device varies depending on the weight of the illuminating unit and its maximum lateral displacement, as previously discussed. A gooseneck can be as bendable and soft as the cable of a vacuum cleaner for light-weight illuminating units and short lateral displacements. On the other hand, the gooseneck must be more rigid for heavy-weight units and large lateral displacements. Next, the higher the rigidity of the gooseneck, the more torque will spiral springs 75 be required to have.

Additionally, a gooseneck's shorter length would require less revolutions from spiral springs 75 than is required from springs of vacuum cleaners. Lengths of vacuum cleaner cables are between 6 to 12 m (20 to 40 ft), and sometimes even longer. Diameters of winding reels in vacuum cleaners are usually 10 to 15 cm. This means that the reel makes around 25 revolutions to wind the whole length of the vacuum cleaner cable. The spring should be elastic enough to preserve its rotating torque for 25 revolutions. In contrast with vacuum cleaner cables, the gooseneck lengths, as previously mentioned, are only in the range 0.6 to 1.2 m (2 to 4 ft). The number of required revolutions for the gooseneck reel is nearly 3, as compared to the 25 revolutions of the vacuum-cleaner case. Spiral springs 75 need only one eighth of the vacuum cleaner revolutions to wind in the reel the entire gooseneck length. While the number of revolutions decreases significantly, the amount of spring torque increases to a smaller degree. Overall, the substantially lower number of revolutions outweighs the moderately higher demand on spring torque.

Operation

The pull-down lighting device is controlled as a conventional lighting fixture in its retracted position on the vehicle ceiling. It is turned on and off by pressing power pushbutton 27, and it is turned on automatically by a vehicle's control processor (for example, when opening a door).

In addition, the pull-down lighting device has extra features and operations, such as pulling down, repositioning, and retracting back to the ceiling. The user uses one or two fingers to grip finger-handle 31 and pull down illuminating unit 23 from the retracted location. The user can stop pulling the unit at any intermediary location and resume pulling it until a preferred lighting position is reached. This feature allows the user to concentrate the light by directing it toward an object intended to be viewed, as well as by bringing light sources closer to the object.

Turning the illuminating unit away from user's eyes reduces stray light. Bringing the light near the object increases viewing light. As a result, the freedom of positioning the pull-down lighting device improves the quality of lighting. Illuminating unit 23 is retracted back to its retracted position after use. By pressing return pushbutton 29, lock-and-release mechanism 53 releases reel 51, gooseneck 41 automatically retracts behind the ceiling, and illuminating unit 23 pulls up. The user presses with one hand the return pushbutton 29, and guides the pulling-up of illuminating unit 23 with the other, until it snaps into the retracted position.

Second Embodiment

FIGS. 16 to 20

The second embodiment (or low-rise or flat embodiment) is a modification of the first one. It has its retracting unit 25 mounted flat on faceplate 21S. Its retracting unit is almost identical to that of the first embodiment, except for being rotated by 90 degrees and mounted horizontally on the faceplate. The above modifications, as well as a few additional adjustments that follow, make the second embodiment a perfect fit on the ceilings of vehicles like cars, trucks, minivans, crossovers, and the like that only have a low-rising space available between their passenger compartment ceiling and vehicle-enclosing shell.

With its low rise, the second embodiment also permits installation under the hood of engine compartments or inside trunks of cars and other vehicles, and practically on any upper surface within hand reach. The lighting device can be adapted for on/off operation by simply raising or lowering the hood, trunk lid, or the vehicle's back door. The device would be coupled to the vehicle's electric system.

Figure 16:
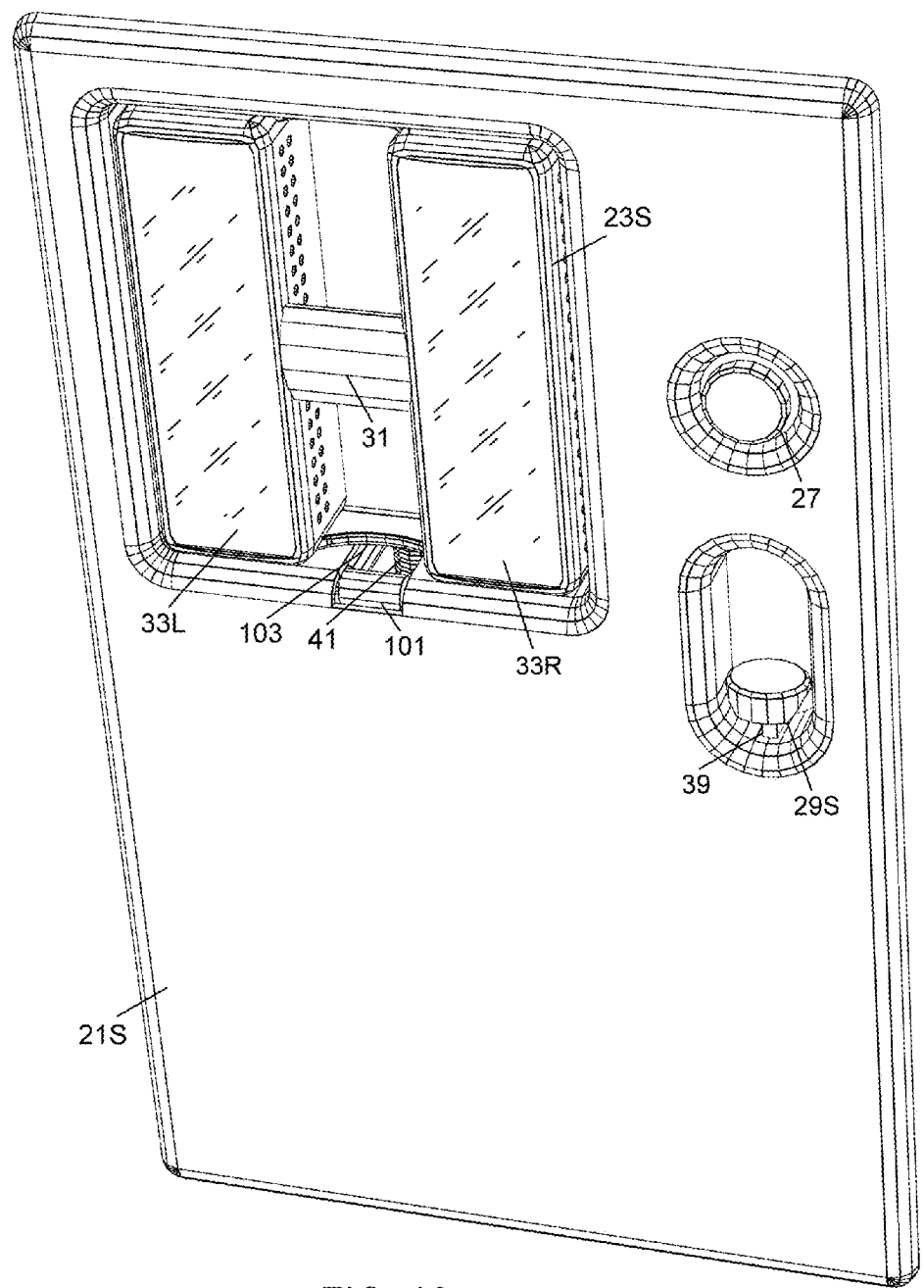
FIG. 16 is a perspective bottom view of a second embodiment of the pull-down lighting device.
Figure 17:
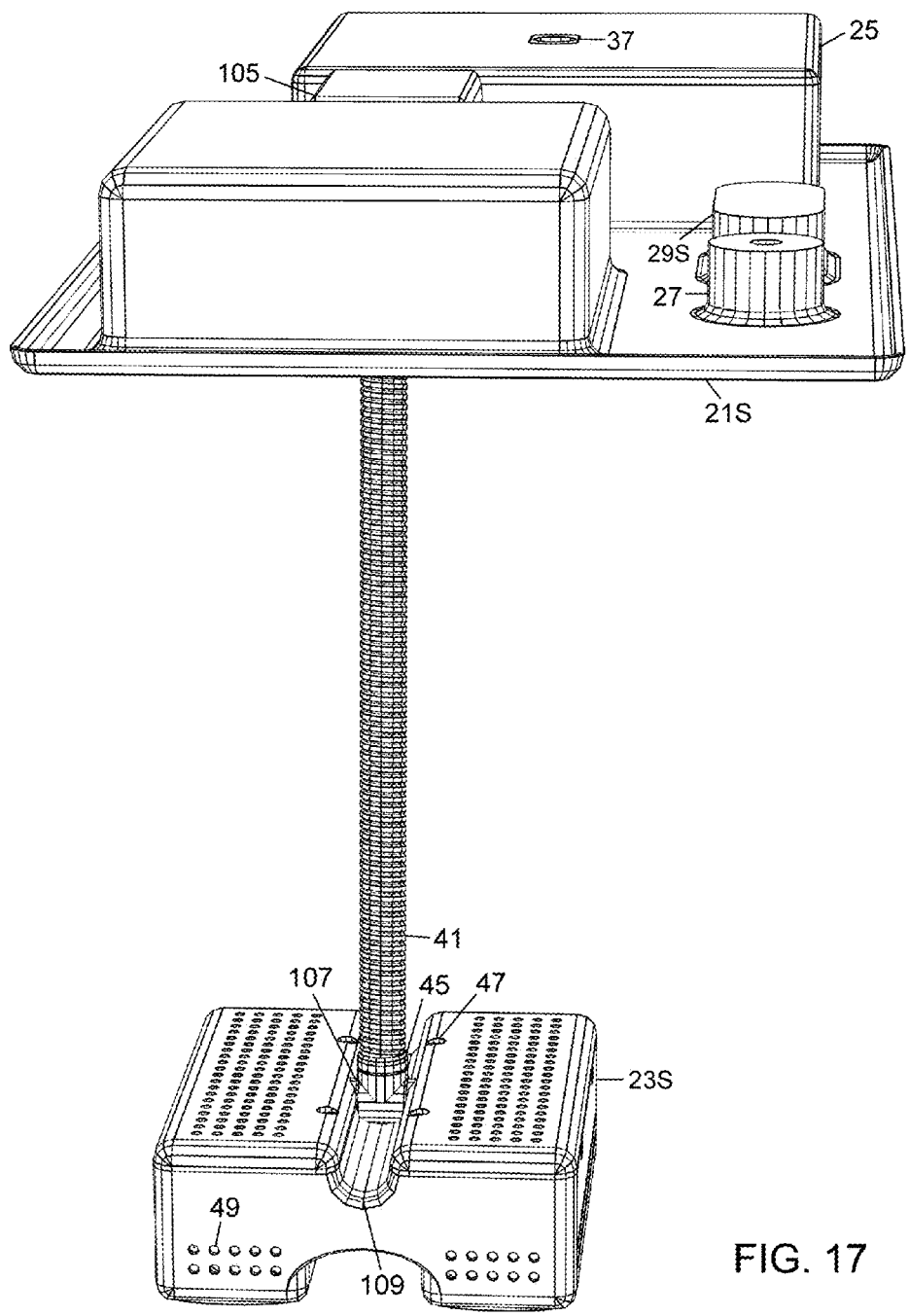
FIG. 17 is a perspective upper view of the second embodiment.

FIGS. 16 and 17 are the bottom and front perspective views of the second embodiment. Compare these views with those of FIGS. 1, 1A, and FIG. 2 of the first embodiment to see modifications of faceplate 21S, pushbutton 29S, and flat mounting of retracting unit 25. Also notice the modification of illuminating unit 23S at its upper part.

Figure 18:
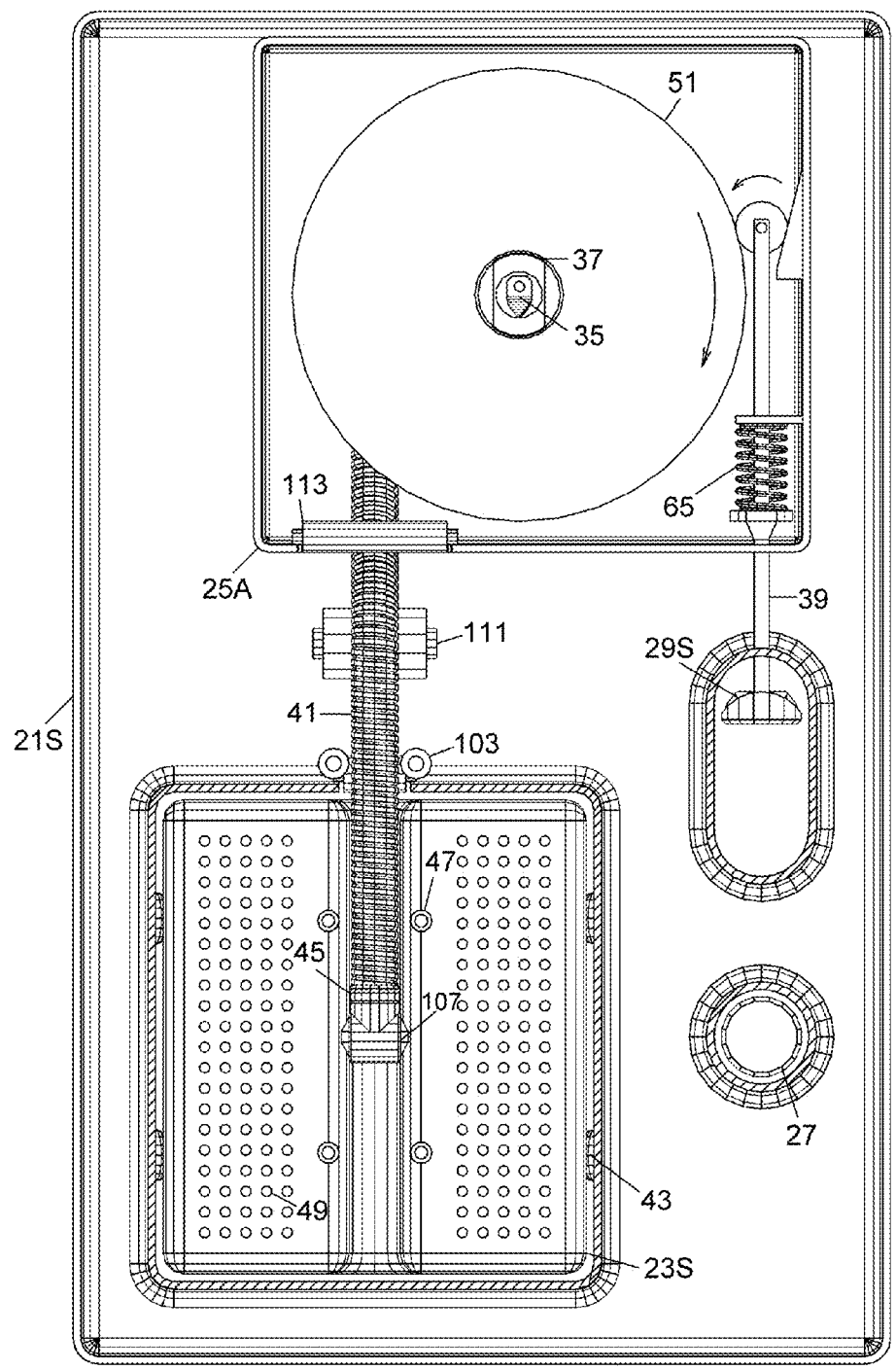
FIG. 18 is a top view of the second embodiment with its lids removed and with cross-sections.
Figure 19:
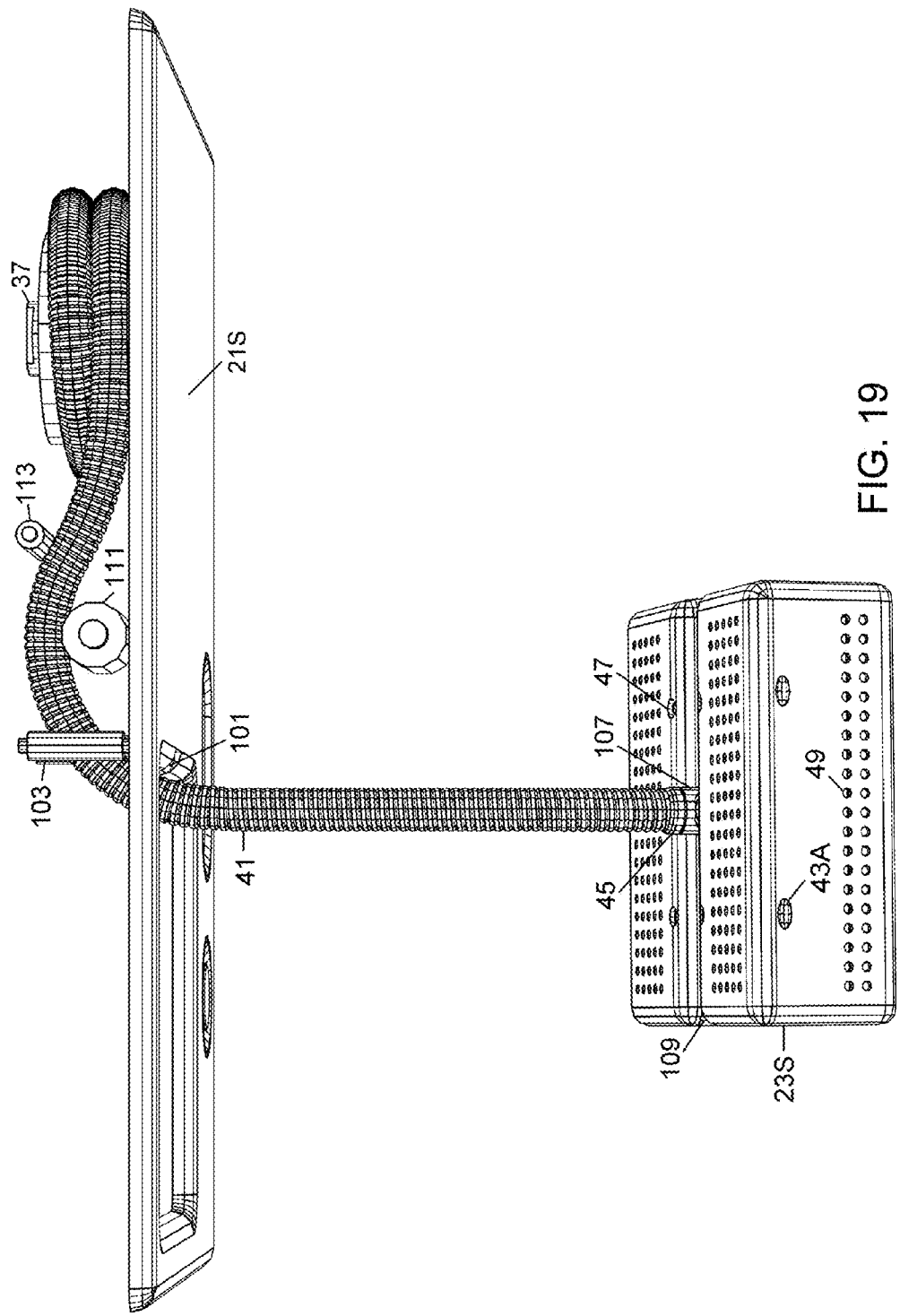
FIG. 19 is a side view of the second embodiment that reveals the gooseneck winding.

Guiding rollers are added in the second embodiment to make gooseneck 41 gradually change direction by more than 90 degrees and enter retracting unit 25, now on a flat mounted position. Guiding rollers 103, 111, and 113 are shown in FIGS. 18 and 19, and the exit roller 101 is better seen in FIGS. 16 and 19. Housing of guiding rollers 105 is shown in FIG. 17.

FIG. 18 is a top view of the flat embodiment. Notice the cross-sections of faceplate 21S on the covers of pushbuttons and illuminating unit. The lid of retracting unit 25 is also removed from base 25A to reveal the unit's inside.

Retracting Unit—Flat Mounting

The retracting unit in the second embodiment is slightly changed at its gooseneck entrance. First, roller 113 is added, smooth nipple 61 is removed, and case opening is enlarged for the gooseneck to roll freely under roller 113 without any frictional contact with case walls. Retracting unit 25 has no other changes, except for being rotated at 90 degrees and mounted horizontally on faceplate 21S.

An extra indent is formed on faceplate 21S to allow a user's finger to enter the indent and conveniently press return-pushbutton 29S in the horizontal direction. Pushbutton 29S activates retracting unit 25, which then pulls illuminating unit 23S to its retracted position.

Gooseneck—Guided Bending

The removal of the housing of retracting unit 25, the upper parts of faceplate 21S, and the housing of guiding rollers 105 reveals the whole gooseneck length from the illuminating unit to the reel. FIG. 19 shows bending of gooseneck 41 more than 90 degrees as it is guided by rollers 103, 111, and 113. These rollers can rotate freely around axial supports (not shown) positioned on faceplate 21S and under housing 105 (FIG. 17). Sizes and positions of guiding rollers must be selected appropriately, so that the gooseneck never bends beyond its limit.

Illuminating Unit—Pivotal Connection

Figure 20:
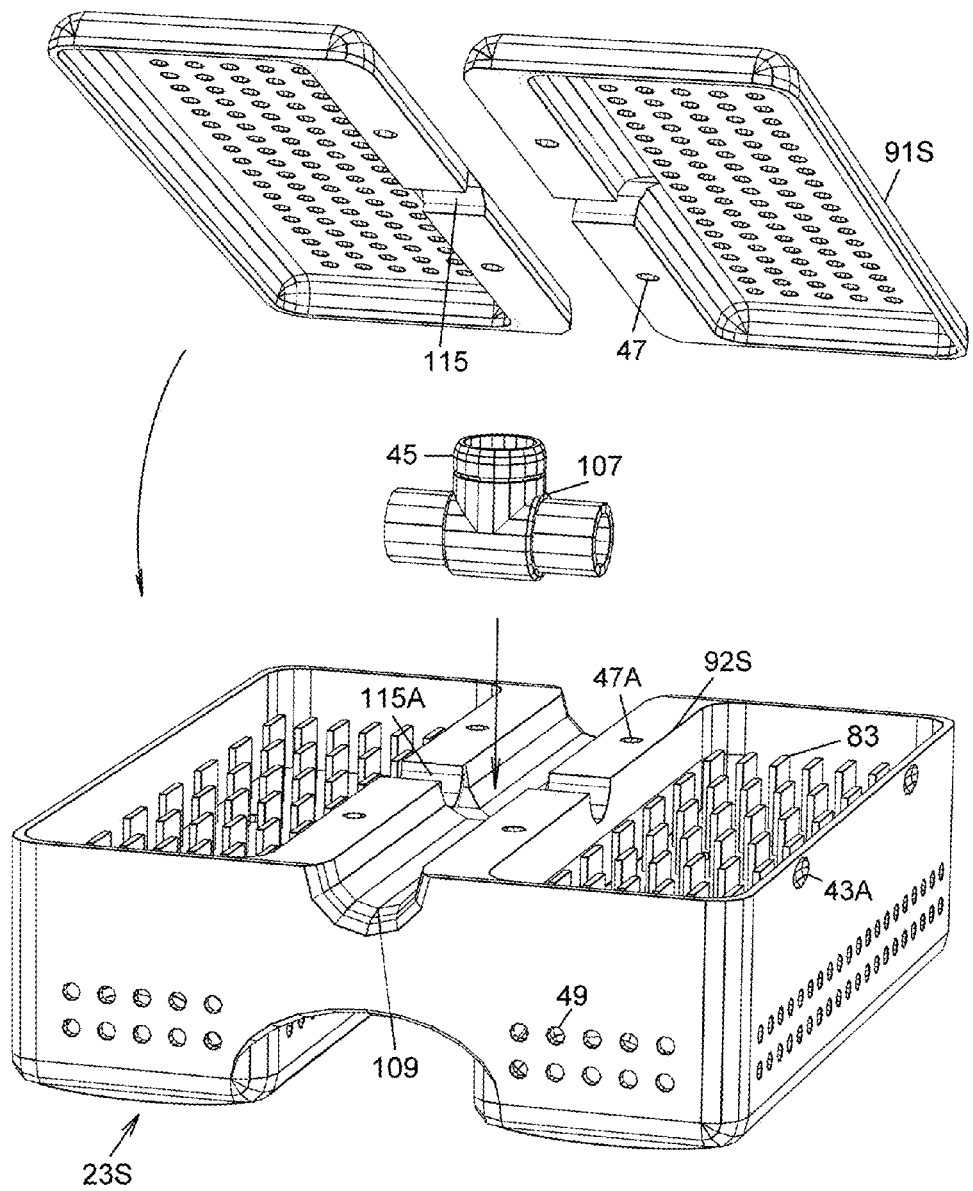
FIG. 20 is an exploded view of the illuminating unit of the second embodiment.

Illuminating unit 23S is shown in FIGS. 16 through 19, and in FIG. 20 (exploded view). Smooth upper nut 45 tightens T-nipple 107 to gooseneck 41. T-nipple 107 can rotate inside cylindrical grooves 115 and 115A, pivotally connecting illuminating unit 23S with gooseneck 41. The pivotal connection allows gooseneck 41 to be packed flat along groove 109 as illuminating unit 23S snaps into its retracted position. Electric wires (not shown) run from gooseneck 41 through T-nipple 107 and through holes in heat sinks 83 (holes not shown) and feed electricity to light sources. The second embodiment has identical light sources to the first one.

Lids 91S of illuminating unit 23S connect to core 92S through screw holes 47 and 47A. Bumps 43 snap into indents 43A and hold illuminating unit 23S steadily in its retracted position. A plurality of ventilating holes 49 provides convectional air flow that keeps illuminating unit cool.

Operation of pull-down lighting device of the second embodiment is substantially the same as that of the first embodiment. However, orientation of illuminating unit 23S has improved functionality on the second embodiment, due to its pivotal connection with gooseneck 41. Illuminating unit 23 rotates around T-nipple 107 up to ±90 degrees in two opposite directions in the pulled-down positions. That gives the second embodiment directional-control advantages over the first embodiment. For example, when using vanity mirrors in a car, the rotation of the illuminating unit around its pivotal connection makes it easy to direct the light toward the user's face or other body parts.

Another operational difference is that pushbutton 29S of the second embodiment is pressed horizontally away from the user; compare this with pushbutton 29 of the first embodiment which is pressed vertically upward.

INDUSTRIAL APPLICABILITY

Besides being applied in vehicle passenger compartment installations, the pull-down lighting device can be installed also under the hood of the engine compartment of vehicles, and it can be mounted also under the cover of the luggage compartment (trunk) of vehicles.

It can be installed in limited spaces inside houses or other buildings where ceilings are within hand reach, some closets being an example. The device can be installed also in hand-reachable ceilings over the bunk beds in places like watercraft cabins or children's summer camps, to mention a few examples. The pull-down self-supportive device with its location and direction control enhances the functionality of illuminating unit and improves the quality of lighting.

Although the above description contains specificities, it merely provides illustrations of some of presently preferred embodiments. Other embodiments and variations of the device, similar to the ones that follow, are expected in the spirit and scope of this invention.

Other Embodiments

Instead of winding reel 5, an elongated power spring can be employed to retract the gooseneck without winding it. Instead of electric-conductive power springs 75 employed in the two embodiments of this disclosure, non-electric power springs in combination with sliding electric contacts can be employed. Sliding contacts are in wide use for cable-winding reels; they are shown in numerous patents, and are known to those of ordinary skill in the art.

Instead of being supported on faceplate 21, the illuminating unit and the retracting unit can be attached (using means well known to those skilled in the art) on the ceiling headliner, or on the vehicle's frame, and/or its inclosing metallic shell. An electric motor can replace power spring(s) that drive retracting unit. Instead of the lock-and-release mechanism described in the specification, other mechanical mechanisms like those used for controlling cable winding reels, safety belts or tape measures can be employed. Some lock-and-release mechanisms are activated by pulling down the cable with a short jolt, eliminating the need for a return pushbutton to activate retracting unit. Those are all well known to a person of ordinary skill in the art and can be employed as well.

Instead of the mechanical lock-and-release mechanism controlled by a mechanical pushbutton as described in the specification, an electro-mechanical equivalent that employs a ferromagnetic relay and an electric switch is a known replacement that can be used. Additional features can be added to the retracting unit, such as a constant pulling torque, speed, or both.

Illuminating unit 23 can have various shapes, such as rectangular, oval, circular etc.; it can have one, two, three or more light sources; it can be built using various materials, such as plastic, hard rubber, carbon fiber, or carbon composite, which are well known to those of ordinary skill in the art, and chosen based on properties, cost, and customer preferences.

Finger-handle 31 can be replaced with two indents, one on each side of the illuminating unit. Indents can accommodate two user fingers, one on each indent. The user can grip the illuminating unit with the thumb in one indent and the pointing finger in the other to pull it down. This is suitable for single-source illuminating units, which are narrower than those with two or more sources. Other forms of finger-handle designs can be used based on the size of illuminating unit, kind and size of vehicles, and customer preferences.

LED-s 79 can be replaced with other types of high-efficiency light sources, such as cold cathode tubes, halogen sources, etc. Driving circuits inside housing 85 (FIG. 11) can be replaced by driving circuits installed above faceplate 21 on the ceiling. This will reduce the weight of the illuminating unit. Instead of snapping-on to the bumps on the faceplate, the illuminating unit can snap-on to similar bumps that are part of the vehicle headliner. Alternatively, a variety of other snap-on mechanisms can be used, which are well documented and well known to those of ordinary skill in the art. Faceplate 21 of the pull-down lighting device can be incorporated into the headliner as a new vehicle is designed.

Gooseneck 41 as previously described comprises two wire wound coils (one inside the other), and a plastic or rubber coating. Characteristics of coils and coatings can vary in broad ranges to provide the proper balance of gooseneck bendability and rigidity. Other gooseneck designs might employ different numbers of coils, or no coils, various coatings and various coil materials. Other gooseneck structures can have uniform or varying distributions of smaller elastic and rigid elements.

Special Technical Features

The pull-down self-supportive lighting device mounted in hand-reachable ceilings has special technical features that provide functionality and offer convenience of operation. While there are variations that create different embodiments, all embodiments of this invention have in common one or more special technical features.

One special technical feature is the structure of the gooseneck with predetermined bendability-rigidity ratio. This feature allows the device to hold its illuminating unit fixed in the pulled-down positions on its own, without requiring any external support when displaced horizontally from the hanging point. This feature is in contrast with retractable lights of the prior art which are attached at the end of a tether or cable and require support from surrounding objects or the user.

Another special technical feature is the finger handle mounted at the bottom part of the illuminating unit, and which facilitates the pulling down and repositioning of the illuminating unit conveniently with a natural move of one hand. The finger-handle is designed with a structure that does not protrude below the ceiling. This makes it safe mechanically if it is hit accidentally by the head or by hand. It also makes the pulling and repositioning of the illuminating unit direct and easy by preferably using two fingers and the thumb of one hand.

Yet another special technical feature is the retracting unit with its power spring structure and lock-and-release design that in combination with the specially designed gooseneck facilitates the retreat of the illuminating unit to the retracted position on the ceiling as the lock-and-release mechanism is activated by pressing the release button. Furthermore, the retracting unit being disposed and concealed above the ceiling makes the device nonintrusive to the user.

The above structural features provide functionality and operational convenience that are critical for industrial applicability. The embodiments of the invention involve the same technical features as above mentioned that together form a single general inventive concept. The aforementioned special technical features, and others that are clearly shown in the drawings and disclosed in the description, define the contributions of this invention over the prior art.

Other structural features enhance the performance of the lighting device. The properly located ventilating holes in the housing of the illuminating unit facilitate natural air convection that keeps the outer surface of the unit cool. The materials used for making the exposed parts of the lighting device are unbreakable, relatively soft, and shock-absorbing. Besides the insulated wiring, the casing of the illuminating unit, the gooseneck, and the faceplate on the ceiling are made of electrically insulating materials. The lighting device is safe in use both mechanically and electrically. The second embodiment of the invention employs a pivotal connection of the illuminating unit with the gooseneck, and also employs rollers that guide the gooseneck movement into and out of the retracting unit that is mounted horizontally above the ceiling.

ADVANTAGES

In all places where ceilings are within the hand's reach, the repositionable pull-down lighting brings enhanced functionality and convenience of use. The self-supportive and mobility features provided by the gooseneck and the retracting unit improve the quality of lighting. The pull-down self-supporting lighting device holds its illuminating unit fixed in a pulled-down position on its own, without requiring any external support on surrounding objects. A user can pull illuminating unit practically towards any position of choice in the proximity of the seating or standing to get the best lighting. The device allows the user to make further adjustments at any time and be in control. After repositioning of the illuminating unit, both hands of the user are free as if someone else is holding the light in the most suitable position and direction for as long as the user needs it. The device brings more light towards selected places, protects eyes from direct light, and avoids shadows created by head, shoulders, and other obstacles into the viewing areas. By increasing illumination of selected spots and practically eliminating the glaring light to the eye, it improves lighting quality, and its efficiency. The device can confine lighting towards targeted areas in limited spaces such as inside vehicles, without spreading it to nearby occupants and possibly annoying them, or lighting the whole passenger compartment and reducing the outside view. It helps avoid risky situations while driving at night, or when a vehicle stops or stalls in an unsafe neighborhood at night.

The pull-down lighting can replace the vanity mirror lights as well. In fact, it enhances the lighting of the face, reduces or eliminates the direct light to the eye, and improves lighting quality. A user can light facial parts while protecting the eyes. The performance of the pull-down lighting in its use as a reading or map light is evident.

The device is nonintrusive as it hides its retracting unit and other parts behind the ceiling, exposing only its illumination and control parts. The illuminating unit of the device works also in its retracted position on the ceiling. The user can turn it on and off, and it can be turned on automatically when a door of the vehicle opens. The device can be mounted on the ceiling nearby doors from where it can light doorsteps and replace courtesy lights in vehicles.

Having such versatility, the pull-down self-supportive lighting can reduce the total number of lights mounted in vehicle interiors and improve lighting in spaces with hand-reachable ceilings.

Accordingly, the scope of the embodiments should be determined by the appended claims and their legal equivalents, rather than by the examples given.

The invention claimed is:

1. A pull-down self-supportive lighting device mounted on a hand-reachable ceiling, the lighting device comprising:
    a retracting unit mounted above an opening on said hand-reachable ceiling, said retracting unit comprising a winding reel, one or more power springs, an externally-activated lock-and-release mechanism,
    an illuminating unit disposed in a retracted position adjacent said retracting unit, said illuminating unit having an underside substantially flush with said hand-reachable ceiling and a non-protruding finger-handle disposed above said underside, said illuminating unit being coupled to an electric system and controlled by an electric switch,
    a gooseneck of predetermined internal structure having a first end and a second end, said gooseneck of predetermined internal structure being connected at said first end to said illuminating unit and at said second end to said retracting unit, said gooseneck of predetermined internal structure enclosing electric wires,
    whereby a user can pull down said illuminating unit from said retracted position adjacent said retracting unit to a lower position closer to a targeted area,
    whereby said gooseneck of predetermined internal structure holds fixed in place said illuminating unit in said lower position closer to a targeted area while feeding electricity thereof,
    whereby the user can activate said externally-activated lock-and-release mechanism so that said retracting unit retracts said illuminating unit to said retracted position.

2. The pull-down self-supportive lighting device of claim 1 wherein said hand-reachable ceiling is the under-roof of a passenger compartment of a motor vehicle, and wherein said illuminating unit has its underside mounted substantially flush with the vehicle's headliner.

3. The pull-down self-supportive lighting device of claim 1 wherein said hand-reachable ceiling is the under-hood of the engine compartment of a motor vehicle.

4. The pull-down self-supportive lighting device of claim 1 wherein said hand-reachable ceiling is the upper-cover of the luggage compartment of a motor vehicle.

5. The pull-down self-supportive lighting device of claim 1 wherein said hand-reachable ceiling is the ceiling of a cabin, closet, or room, located in an aircraft, watercraft, train, or building.

6. The pull-down self-supportive lighting device of claim 1 wherein said power springs are conductive and incorporated in the wiring path feeding electricity to said illuminating unit.

7. The pull-down self-supportive lighting device of claim 1, further including a plurality of guiding rollers located inside said retracting unit, which guide the bending and moving of said gooseneck of predetermined structure while entering and exiting said retracting unit.

8. The pull-down self-supportive lighting device of claim 1, further including a T-nipple connecting pivotally said illuminating unit with said gooseneck of predetermined structure, said pivotal T-nipple having an inside channel and electric wiring enclosed along said channel.

9. A pull-down self-supportive lighting device mounted on a hand-reachable ceiling, the lighting device comprising:
- a retracting unit mounted above an opening on said hand-reachable ceiling, said retracting unit comprising means of retraction and an externally-activated lock-and-release mechanism,
- an illuminating unit disposed in a retracted position adjacent said retracting unit, said illuminating unit having an underside substantially flush with said hand-reachable ceiling and gripping-with-one-hand means for pulling down and repositioning said illuminating unit, said illuminating unit being coupled to an electric system and controlled by an electric switch,
- a gooseneck of predetermined internal structure having a first end and a second end, said gooseneck of predetermined internal structure being connected at said first end to said illuminating unit and at said second end to said retracting unit, said gooseneck of predetermined internal structure enclosing electric wires,
- whereby a user can pull down said illuminating unit from said retracted position adjacent said retracting unit to a lower position closer to a targeted area,
- whereby said gooseneck of predetermined internal structure holds fixed in place said illuminating unit in said lower position closer to a targeted area while feeding electricity thereof,
- whereby the user can activate said externally-activated lock-and-release mechanism so that said retracting unit retracts said illuminating unit to said retracted position.

10. The pull-down self-supportive lighting device of claim 9 wherein said hand-reachable ceiling is the under-roof of a passenger compartment of a motor vehicle, and wherein said illuminating unit has its underside mounted substantially flush with the vehicle's headliner.

11. The pull-down self-supportive lighting device of claim 9 wherein said hand-reachable ceiling is the under-hood of the engine compartment of a motor vehicle.

12. The pull-down self-supportive lighting device of claim 9 wherein said hand-reachable ceiling is the upper-cover of the luggage compartment of a motor vehicle.

13. The pull-down self-supportive lighting device of claim 9 wherein said hand-reachable ceiling is the ceiling of a cabin, closet, or room, located in an aircraft, watercraft, train, or building.

14. The pull-down self-supportive lighting device of claim 9, wherein said means of retraction are a couple of conductive power springs mounted inside a winding reel, wherein said couple of conducting springs are incorporated in the electric wiring of said illuminating unit.

15. The pull-down self-supportive lighting device of claim 9, further including a plurality of guiding rollers located inside said retracting unit, which guide the bending and moving of said gooseneck of predetermined structure while entering and exiting said retracting unit.

16. The pull-down self-supportive lighting device of claim 9, further including a T-nipple connecting pivotally said illuminating unit with said gooseneck of predetermined structure, said pivotal T-nipple having an inside channel and electric wiring enclosed along said channel.

17. The pull-down self-supportive lighting device of claim 9 wherein said gripping-with-one-hand means is a non-protruding finger-handle disposed flush with said hand-reachable ceiling.

18. A method of lighting a selected area under a hand-reachable ceiling, the method comprising:
- providing a retracting unit mounted above an opening on said hand-reachable ceiling, said retracting unit comprising means of retraction, and an externally-activated lock-and-release mechanism,
- providing an illuminating unit disposed adjacent to said retracting unit, said illuminating unit having an underside substantially flush with said hand-reachable ceiling and gripping-with-one-hand means for pulling down and repositioning said illuminating unit, said illuminating unit being coupled to an electric system and controlled by an electric switch,
- providing a gooseneck of predetermined internal structure having a first end and a second end, said gooseneck enclosing electric wires along its length,
- connecting electric wires and said first end of said gooseneck to said illuminating unit and said second end to said retracting unit,
- winding said gooseneck inside said retracting unit with said illuminating unit being disposed in said retracted position,
- pulling down said illuminating unit from said retracted position adjacent said retracting unit to a lower position closer to a targeted area, whereby said gooseneck holds fixed in place said illuminating unit while feeding electricity thereof,
- activating said externally-activated lock-and-release mechanism so that said retracting unit retracts said illuminating unit back to said retracted position.

* * * * *